United States Patent

Domeier et al.

(10) Patent No.: US 6,679,471 B2
(45) Date of Patent: *Jan. 20, 2004

(54) CASTABLE PLASTIC MOLD WITH ELECTROPLATABLE BASE

(75) Inventors: Linda A. Domeier, Danville, CA (US); Alfredo M. Morales, Livermore, CA (US); Marcela G. Gonzales, Seattle, WA (US); Patrick M. Keifer, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 10/052,948

(22) Filed: Jan. 17, 2002

(65) Prior Publication Data

US 2002/0179449 A1 Dec. 5, 2002

Related U.S. Application Data

(63) Continuation-in-part of application No. 09/765,078, filed on Jan. 17, 2001, now Pat. No. 6,422,528.

(51) Int. Cl.⁷ .............................................. B22D 25/40
(52) U.S. Cl. ........................ 249/60; 249/61; 249/135; 249/83
(58) Field of Search ................. 249/60, 61, 135, 249/83, 62, 134; 264/219, 241

(56) References Cited

U.S. PATENT DOCUMENTS

| | | | |
|---|---|---|---|
| 3,535,211 A | 10/1970 | Frowde | 205/67 |
| 4,336,221 A | 6/1982 | Garabedian | 264/241 |
| 4,351,653 A | 9/1982 | Becker et al. | 55/394 |
| 4,541,977 A | 9/1985 | Becker et al. | 264/182 |
| 4,661,212 A | 4/1987 | Ehrfeld et al. | 209/75 |
| 4,981,558 A | 1/1991 | Maner | 209/75 |
| 5,055,163 A | 10/1991 | Bier et al. | 209/75 |
| 5,073,237 A | 12/1991 | Bacher et al. | 264/320 |
| 5,162,078 A | 11/1992 | Bley et al. | 205/75 |
| 5,190,637 A | 3/1993 | Guckel | 205/118 |
| 5,378,583 A | 1/1995 | Guckel et al. | 430/325 |
| 5,576,147 A | 11/1996 | Guckel et al. | 430/313 |
| 5,676,983 A | 10/1997 | Bacher et al. | 425/385 |
| 5,780,140 A | 7/1998 | Nilsen | 428/172 |
| 5,795,519 A | 8/1998 | Bacher et al. | 264/139 |
| 5,875,549 A | 3/1999 | McKinley | 29/889.2 |
| 6,027,630 A * | 2/2000 | Cohen | 205/135 |
| 6,422,528 B1 * | 7/2002 | Domeier et al. | 249/60 |

FOREIGN PATENT DOCUMENTS

RU    2184799 C1    7/2002

OTHER PUBLICATIONS

Becker et al. (1986), "Fabrication of Microstructures with High Aspect Ratios and Great Structural Heights by Synchrotron Radiation Lithography, Galvanoforming, and Plastic Moulding (LIGA Process)," *Microelectronic Engineering* 4:35–56.

* cited by examiner

*Primary Examiner*—Robert Davis
*Assistant Examiner*—Joseph S Del Sole
(74) *Attorney, Agent, or Firm*—Reed & Eberle LLP (57) ABSTRACT

A sacrificial plastic mold having an electroplatable backing is provided as are methods of making such a mold via the infusion of a castable liquid formulation through a porous metal substrate (sheet, screen, mesh or foam) and into the features of a micro-scale master mold. Upon casting and demolding, the porous metal substrate is embedded within the cast formulation and projects a plastic structure with features determined by the mold tool. The plastic structure provides a sacrificial plastic mold mechanically bonded to the porous metal substrate, which provides a conducting support suitable for electroplating either contiguous or non-contiguous metal replicates. After electroplating and lapping, the sacrificial plastic can be dissolved, leaving the desired metal structure bonded to the porous metal substrate. Optionally, the electroplated structures may be debonded from the porous substrate by selective dissolution of the porous substrate or a coating thereon.

18 Claims, 4 Drawing Sheets

CASTABLE PLASTIC MOLD WITH ELECTROPLATABLE BASE

CROSS-REFERENCE TO RELATED APPLICATIONS

This is a continuation-in-part of U.S. patent application Ser. No. 09/765,078, filed Jan. 17, 2001, now U.S. Pat. No. 6,422,528 the disclosure of which is incorporated by reference herein.

ACKNOWLEDGEMENT OF GOVERNMENT SUPPORT

The United States Government has rights in this invention pursuant to Contract No. DE-AC04-94AL85000 between the United States Department of Energy and Sandia Corporation for the operation of Sandia National Laboratories.

TECHNICAL FIELD

The present invention relates to the replication of metal micro-scale parts, and more specifically, it relates to the production of sacrificial, electroplatable molds. Such electroplatable molds enable the efficient replication of metal micro-scale parts, which would otherwise require the iteration of synchrotron exposures and other costly or time-consuming processes.

BACKGROUND

A key challenge in LIGA (described below) is the replication of multiple sacrificial molds for the electroplating of metal parts/structures. Many applications require metal parts for mechanical, electrical or other reasons. The ability to replicate electroplatable plastic molds would eliminate the need for repetitive synchrotron exposures, a costly and time-consuming step, as well as the subsequent development step.

The production of micro-scale metal parts via LIGA (German acronym for lithography, electroplating and molding) is a multi-step process requiring mask production, synchrotron exposure of the polymethylmethacrylate (PMMA) substrate (typically PMMA bonded to a metallized silicon wafer or a solid metal plate), development of the PMMA, electroplating to fill the cavities left within the PMMA mold, lapping and final dissolution of the remaining PMMA. Such technology is described in U.S. Pat. No. 5,378,583. A constraining step in this process is the requirement for access to one of the very limited number of synchrotron facilities. If the electroplatable PMMA (or other plastic) molds could be replicated without the need for repetitive synchrotron exposures, this would provide an enormous savings in time and cost in the production of larger quantities of the desired metal parts.

Numerous approaches to this replication problem have been explored at Kernforschungszentrum Karlsruhe GmbH.

U.S. Pat. No. 4,541,977, entitled "Method For Producing Separating Nozzle Elements," is directed to a specific method for producing a complex multi-nozzle assembly including an array of micro-channels and nozzles held between top and bottom plates with corresponding inlets and outlets. This assembly is used for the separation of gaseous or vaporous mixtures. A process for the replication of the internal features is described which infuses a polymer into a master mold of the internal features so that the polymer contacts a metallic bottom plate. Upon removal of the master mold, the negative plastic mold remains adhered to the bottom plate due to the presence of dove-tailed inlets which lock onto the infused plastic. Subsequent electroplating of this structure provides a metal replicate of the original master features from which the plastic mold can then be removed.

U.S. Pat. No. 4,661,212, entitled "Method For Producing A Plurality Of Plate Shaped Microstructured Metal Bodies," provides a number of more general approaches for producing electroplatable plastic molds that rely on the use of metal or carbon filled PMMA formulations. Different methods are used depending on whether the features to be electroplated are contiguous or non-contiguous. Non-contiguous features require the casting of an unfilled non-conductive PMMA resin into the features of a master mold followed by a second overlay casting with a filled conductive PMMA. Upon removal of the plastic mold from the master mold, the filled PMMA overlay provides a conductive and electroplatable base to which the unfilled PMMA features are bonded. One variation on this approach, also described in the '212 patent, involves the prefabrication of a two-layer PMMA substrate in which one layer is unfilled and insulating and the second, bottom layer contains a conductive filler and is therefore conductive. This two-layer substrate is embossed with a master mold such that the features of the master mold penetrate through the insulating unfilled layer into the conductive filled layer. Such two-layer substrates are also used in other patents referenced below. The '212 patent describes another process suitable only for contiguous features in which the master mold is first dip-coated to apply a thin mold release layer to the feature tops and then similarly dip-coated in a conductive, filled PMMA formulation such that the feature tops only are coated. The wells between the features on this mold are then filled and covered with an unfilled, non-conductive PMMA material. Upon removal from the master mold, the contiguous conducting path of the filled PMMA layer allows electroplating of the desired metal replicate.

U.S. Pat. No. 4,981,558 titled "Process For The Reproduction Of A Microstructured, Plate-Shaped Body," discloses a process similar to that described in U.S. Pat. No. 4,661,212 with the addition of ultrasound to enhance penetration of the metal master mold through the insulating top layer and into the conducting PMMA bottom layer of a pre-formed two-layer PMMA substrate. Use of ultrasound permits the elimination of the heating and cooling steps normally involved in such embossing procedures.

U.S. Pat. No. 5,055,163, is titled "Process For Producing A Two-Dimensionally Extending Metallic Microstructure Body With A Multitude Of Minute Openings And A Tool Suitable For This Invention," describes a similar process to that described in U.S. Pat. No. 4,661,212. In the process described in the '163 patent, a master mold with multiple tapered projections is embossed into a two-layer substrate in which the conducting lower layer might be a filled PMMA, another filled polymer or a metal having a low melting point. The tapered feature tips facilitate penetration of the master features through the top layer and into the conducting layer of the substrate. The use of cylindrical master tools in a continuous process and the use of ultrasound are also described.

U.S. Pat. No. 5,073,237 titled "Method Of Making Molds For Electrodeposition Forming Of Microstructured Bodies," discloses a method that overcomes some of the difficulties associated with the preceding processes by using a two-layer substrate that consists of a sputtered or vapor deposited film of metal or carbon on an insulating polymer base such as PMMA. During the standard embossing process, the metal film along the walls of the embossed features is stretched and disrupted to form a discontinuous and therefore non-conductive array of isolated spangles of the deposited film. The film in the bottom of the embossed features is not disrupted in this manner and provides a conductive contact for subsequent electroplating of the features. The features in this case must be contiguous, however.

It is important in the electroplating of micro-features with high aspect ratios that the walls of the electroplating mold be non-conductive. If the feature walls as well as the feature bases are conductive, the electroplating process will tend to close off the feature cavity before it has been completely plated up from the bottom. Such difficulties preclude the simple deposition of a metallic conducting film on the surface of a sacrificial plastic mold prior to electroplating or the use of conductive plastics in a standard embossing or injection molding process to form sacrificial molds. In the case of features having low aspect ratios, either of the above options is readily applicable.

U.S. Pat. No. 5,162,078, titled "Method Of Producing Microstructured Metallic Bodies," is directed to the removal by reactive ion etching of residual polymeric films in the bottom of plastic mold cavities, which would prevent electroplating on the conductive base supporting those features. Such residues are a potential problem when embossing through the two-layer substrates described in many of the above patents. The reactive ion etch is directed perpendicularly to the surface of the base plate to avoid degradation of the plastic features.

U.S. Pat. No. 5,676,983 titled "Tool For Making A Microstructured Plastic Mold From Which Structures Can Be Formed Galvanically," and U.S. Pat. No. 5,795,519 titled "Process Of Making A Microstructured Plastic Mold," again describe a two-layer substrate but provide an embossing master mold in which the walls of features formed in the master mold are smooth while the top surfaces of the features possess rough surfaces having points and ridges adapted to penetrate into the electrically insulating layer. This enhanced penetration allows the embossing tool to more efficiently expose the electrically insulating layer at the bottom of the embossed cavities.

None of the above processes provide a simple and versatile method of replicating either contiguous or non-contiguous features in a sacrificial plastic mold. Many require the pre-fabrication of specific plastic substrates, which contain a conducting layer adhered to a non-conducting layer with precise height requirements. Various techniques also have been used to ensure penetration of the tooled embossing features through the non-conducting layer into the conducting layer. Some of these techniques require the fabrication of special embossing tools with sharpened or roughened features. In addition, some of the techniques are applicable only to contiguous features, a major limitation.

There remains a need in the micro-fabrication art for a method of replicating metal structures that is simple, versatile, useful in replication non-contiguous features as well as contiguous features, and requires neither the pre-fabrication of specific plastic substrates nor special embossing tools as alluded to above. The present invention provides such a method, and, as such, represents a significant advance in the art of microfabrication.

SUMMARY OF THE INVENTION

Accordingly, it is a primary object of the present invention to address the above-described need in the art by providing a sacrificial plastic mold having an electroplatable backing useful in a method for replicating metal structures and parts.

It is another object of the present invention to provide a sacrificial plastic mold prepared using plastic forming technologies without need for repetitive lithographic exposures.

It is still another object of the present invention to provide a sacrificial plastic mold with more than one level of features, wherein the features in the different levels may be the same or different.

It is a further object of the present invention to provide a sacrificial plastic mold in which either contiguous or non-contiguous features may be electroplated.

It is still a further object of the invention to provide a method for making a sacrificial plastic mold having an electroplatable backing.

Additional objects, advantages and novel features of the invention will be set forth in part in the description that follows, and in part will become apparent to those skilled in the art upon examination of the following, or may be learned by practice of the invention.

The invention provides a sacrificial plastic mold having an electroplatable backing, and a method for making a mold. The mold comprises the cast product of the infusion of a castable liquid formulation through a porous metal substrate (e.g., a sheet, screen, mesh or foam) and into the features of a micro-scale master mold supporting and/or contacting the porous metal substrate. Upon curing of the castable liquid formulation, i.e., polymerization and/or solvent removal, and removal of the master mold, the porous metal substrate becomes embedded within the surface of the cast mold and a cast structure with features determined by the master mold will project from the surface of the porous metal substrate. This cast structure, in turn, provides a sacrificial plating mold that can be used to replicate the features of the original master mold. In particular, the porous metal substrate to which the cast mold is mechanically bonded provides an electroplateable backing, i.e., a conducting support suitable for electroplating processes. After electroplating, the plated metal can be lapped and polished and the sacrificial cast mold can be dissolved to leave the replicated metal structure bonded to the metal substrate.

If a metal structure is desired, the cast mold can be overplated and the overplated metal then lapped and polished to provide a metal base containing the electroplated features. Machining and polishing processes can then remove the porous metal substrate. Alternatively, the electroplated parts can be detached from the metal substrate by the use of different metals for the substrate and electroplating process and subsequent selective dissolution of the substrate metal. In another variation, an appropriate metal coating or strike is deposited on the porous metal substrate, before or after the casting process used to form the sacrificial plastic mold. That metal coating or strike can then be selectively dissolved to release the plated metal parts.

Both hot embossing and injection molding processes can also be used to infuse thermoplastic materials through the porous metal substrate and into the contacting mold. Both methods are discussed in copending U.S. patent application Ser. No. 09/765,078, filed Jan. 17, 2001 now U.S. Pat. No. 6,422,528B1.

In another embodiment, the invention provides a method for manufacturing the above-described sacrificial plastic mold. The method involves infusing a castable liquid formulation through a porous metal substrate and into the features of a micro-featured tool and then cured via polymerization and/or solvent removal to form a cast mold containing an electroplatable metal substrate. Such casting processes may be carried out by hand or by using resin transfer molding (RTM) or reaction injection molding (RIM) equipment. The use of evacuated mold cavities in conjunction with the automated equipment is desirable to reduce entrapped air. It is also desirable to degas the castable liquid formulations either by vacuum if the components are not highly volatile or by simply holding the liquid under ambient conditions for a period prior to casting. The arrangement of the porous metal substrate, the master mold and the infused castable liquid formulation will vary according to the process used.

DETAILED DESCRIPTION OF THE INVENTION

Before describing the present invention in detail, it is to be understood that unless otherwise indicated this invention is not limited to specific castable materials, porous metal substrates, patterning methods, or the like, as such may vary. It must be noted that, as used in this specification and the appended claims, the singular forms "a," "an," and "the" include plural referents unless the context clearly dictates otherwise. Thus, for example, reference to "a" polymerized castable liquid formulation includes a single such formulation as well as combinations or mixtures of different polymerized castable liquid formulations, reference to "a porous metal substrate" includes two or more porous metal substrates as well as a single such substrate, reference to "a microscale feature" includes a single microscale feature as well as multiple microscale features, and the like. The term "polymer" is used herein in its conventional sense to refer to a compound having two or more monomer units, and is intended to encompass homopolymers as well as copolymers. Those polymers herein that are referred to as "curable" are capable of becoming crosslinked, thermally, chemically or photolytically, so that a cured polymeric matrix may be provided. Curable compositions also include those liquid formulations that may be hardened by solvent removal either with or without the application of heat The term "monomer" refers to a molecular entity capable of undergoing a polymerization reaction with like molecular entities, to form a polymer. Thus, the term "monomer" can include polymerizable oligomer segments as well as non-oligomeric, single molecular entities.

The terms "micro-feature" and "microscale feature" are used interchangeably to refer to a feature of micron or submicron dimensions. The feature may be a protrusion or a recess, e.g., a ridge, pillar, channel, chamber, or the like, wherein the length, width, height, and/or depth of the feature is on the order of approximately 0.1 $\mu$m to 1000 $\mu$m, generally about −0.5 $\mu$m to 500 $\mu$m, and most typically about 1 $\mu$m to 200 $\mu$m.

The term "porous" as in a "porous substrate" or a "substrate having a porous surface," refers to a substrate or surface, respectively, having a porosity (void percentage) in the range of about 1% to about 99%, preferably about 5% to about 99%, more preferably in the range of about 15% to about 95%.

The term "substantially" as in, for example, the term "substantially coplanar," means that at least 90%, preferably at least 95%, more preferably at least 99%, and most preferably at least 99.9% of a first surface is coplanar with respect to a second surface.

"Optional" or "optionally" means that the subsequently described circumstance may or may not occur, so that the description includes instances where the circumstance occurs and instances where it does not. Accordingly, a composition described as containing an "optional" additive, such as an "optional" filler, includes both a composition that does not contain the additive and a composition that does contain the additive.

Figure 1A:
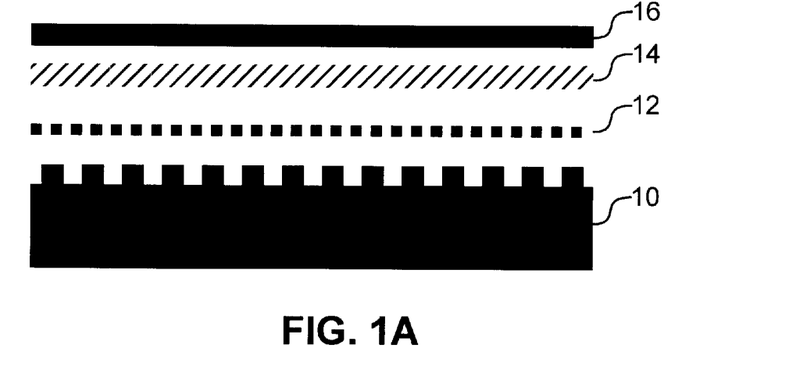
FIG. 1A schematically illustrates the non-plastic components of the casting process, which include a master mold with protruding micro-features, a micro-etched metal screen, a porous metal foam and a rigid metal backing containing one or more solid metal plates.

FIGS. 1A–1E illustrate one embodiment of the present invention that utilizes the infusion of a castable liquid formulation and subsequent polymerization thereof to form sacrificial plastic molds for electroplating metal structures. FIG. 1A shows a master mold 10 upon which is placed a porous metal substrate, in this case a micro-perforated metal screen 12 backed with a pliable, porous metal foam 14, and covered with a rigid metal backing 16 formed from one or more solid plates. These plates may also contain macroscopic holes or other patterns that do not compromise the rigidity of the plates.

The master mold having micro-scale features contained therein may be fabricated, for example, using the LIGA process or other micro-machining technologies. In such a LIGA tool fabrication process, a solid metal plate may be used as the base supporting the PMMA resist material in such a process and would thus provide a metal tool onto which the micro-features have been electroplated. Alternatively, a silicon wafer can be used as the base and the electroplated metal can then be overplated and machined to provide the final metal tool to which the electroplated features are attached. Dissolution processes would then release the silicon wafer. Such processes are disclosed in U.S. Pat. No. 5,378,583 to Guckel et al. Closely related process uses UV lithography with a thick film photoresist such as SU-8 in place of the X-ray lithography and PMMA resist in the LIGA process. As known in the art, SU-8 is a negative, epoxy-type, near-UV photoresist formulation available from MicroChem Corporation in Newton, Mass. and is particularly useful for preparing features with very high aspect ratios (on the order of 20 or higher) using standard lithography equipment. See U.S. Pat. No. 4,882, 245 to Gelorme et al. and Lorenz et al. (1998), "Mechanical Characterization of a New High-Aspect-Ratio near UV-photoresist," *Microelec. Engin.* 41/42:371–374.

Figure 1B:
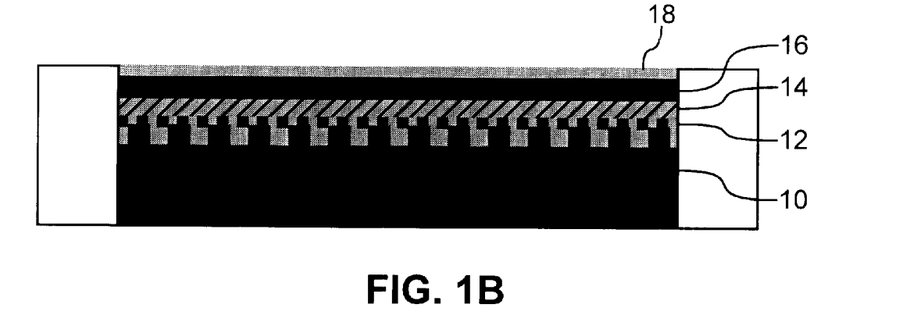
FIG. 1B schematically illustrates a mold cavity filled with a castable liquid formulation that has infused the porous metal substrates and the features in the master mold.
Figure 1C:
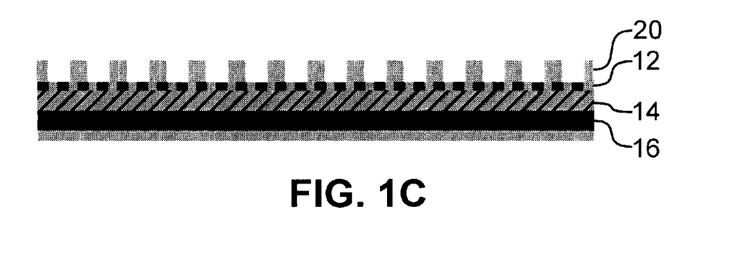
FIG. 1C schematically illustrates the porous metal substrate, backing sheet, and the cast mold after curing of the castable liquid formulation and removal from the master mold.
Figure 1D:
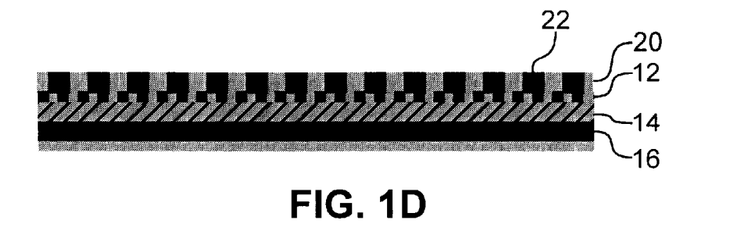
FIG. 1D schematically illustrates the cast mold, the porous metal substrate, and backing sheet after the cavities in the plastic mold have been filled with electroplated metal. In this case, any overplated metal has been removed by lapping and polishing.
Figure 1E:
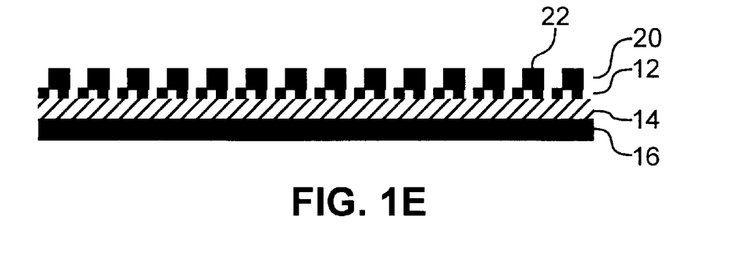
FIG. 1E schematically illustrates the remaining electroplated metal structure after the cast mold has been dissolved.

In FIG. 1B, a castable liquid formulation 18 is infused through the pores or perforations in the perforated metal screen 12 and porous metal foam 14 filling in the features of master mold 10 and encapsulating any rigid metal plate or plates that may be present. In the depicted embodiment, a rigid backing 16 is shown. The castable liquid formulation is then hardened or polymerized to form a cast mold. As shown in FIG. 1C, after the master mold 10 is removed, the cast mold 20 and the perforated metal screen 12, porous metal foam 14, and rigid backing 16 remain together and provide the desired sacrificial plating mold. Using standard electroplating processes, the sacrificial plating mold is then filled in with electroplated metal 22 as shown in FIG. 1D. Suitable metals that can be used for electroplating include, but are not limited to, nickel, copper, silver, platinum, gold, nickel/iron, nickel/cobalt, nickel/tungsten, tin/lead and other mixtures and alloys thereof. Machining and polishing processes might be employed as needed to level any overplated metal to the height shown. The electroplated metal structure consisting of the electroplated metal 22 attached to the perforated metal screen 12, porous metal foam 14 and rigid metal backing 16, as shown in FIG. 1E, remains after the cast mold is dissolved. As noted above, various selective metal dissolution or overplating and lapping processes might also be used to provide free metal parts or structures.

Figures 2A, 2B:
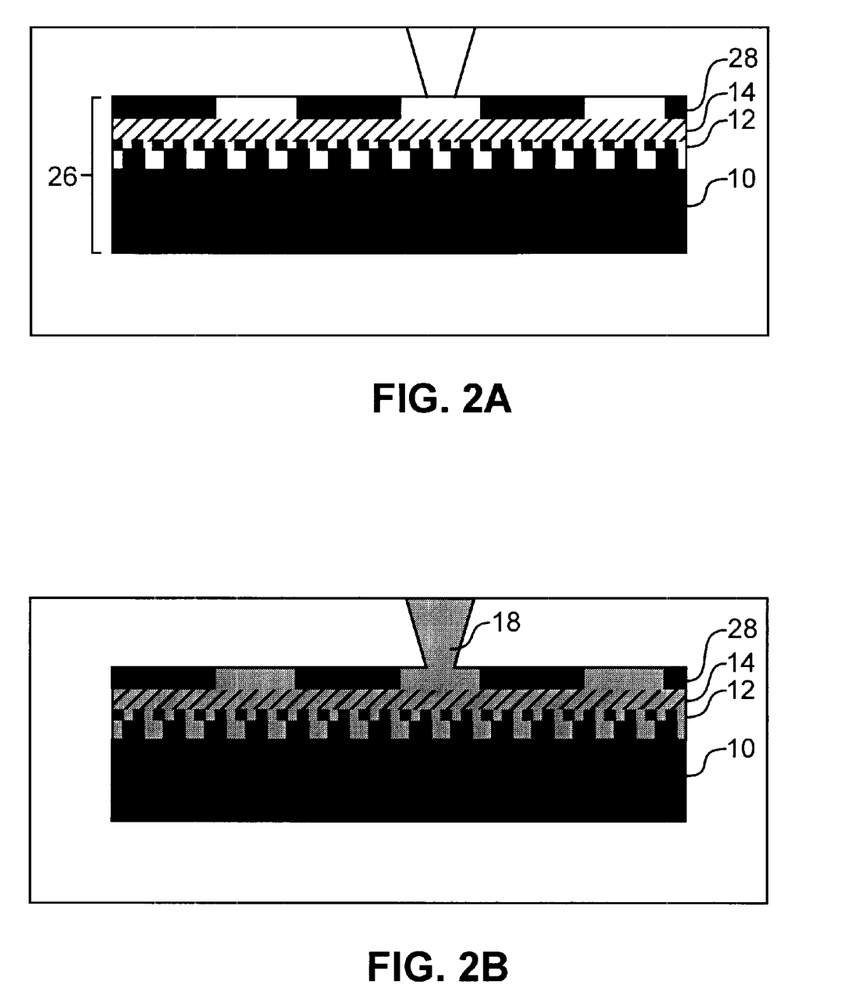
FIG. 2A schematically illustrates a closed molding cavity, such as contained in a RIM or RTM machine, with a master mold in the bottom of the cavity. Lying on top of the master mold is a thin porous metal substrate. On top of the metal substrate is a porous metal foam and on top of the foam is a perforated metal sheet.
FIG. 2B schematically illustrates the mold cavity filled with an injected castable liquid formulation plastic that has infused the porous metal substrates and the features in the master mold.
Figure 2C:
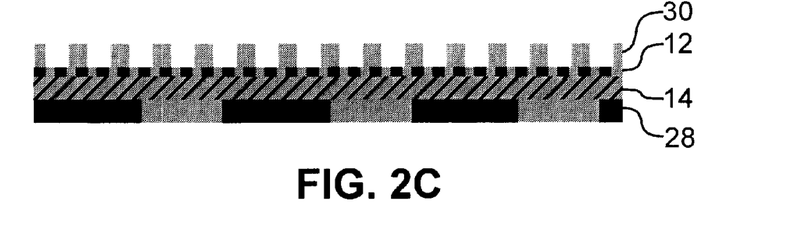
FIG. 2C schematically illustrates the porous metal substrates and the cast mold after curing of the castable liquid formulation and removal from the mold cavity.
Figure 2D:
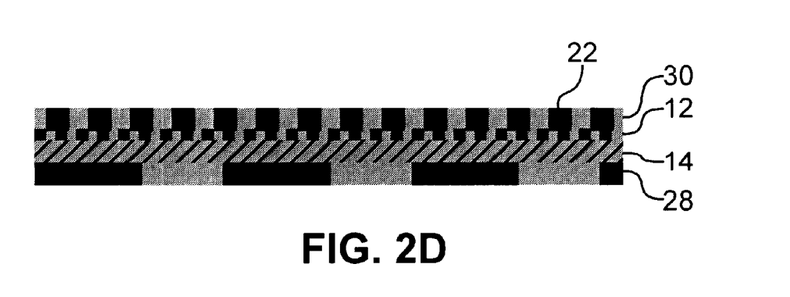
FIG. 2D schematically illustrates the cast mold and the porous metal substrates after the cavities in the plastic mold have been filled with electroplated metal. In this case, any overplated metal has been removed by lapping and polishing.
Figure 2E:
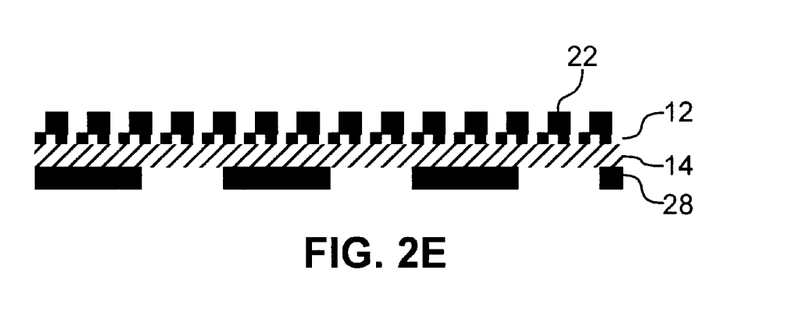
FIG. 2E schematically illustrates the remaining electroplated metal structure after the injected cast mold has been dissolved.

FIGS. 2A–2E illustrate another embodiment of the present invention, which uses RIM or RTM of the castable liquid formulation in combination with one or more porous metal substrates placed within the mold cavity. As shown in FIG. 2A, both a micro-perforated metal sheet 12 and a pliable, porous metal foam 14 are stacked within the RIM cavity 26 on top of the master mold 10 and are covered by a macroporous metal plate 28. Upon injection, the castable liquid formulation 18 is infused through the porous metal substrates into the tooled features of master mold 10 as shown in FIG. 2B. As before, the castable liquid formulation is then hardened or polymerized to form a cast mold 30. FIG. 2C shows the cast mold 30 and porous metals 12 and 14, and macroporous metal plate 28, after removal from the mold cavity 26. FIG. 2D shows the sacrificial plating mold filled in with electroplated metal 22 and FIG. 2E shows the resulting electroplated metal structure, which consists of a micro-perforated metal sheet 12, metal mesh 14, macroporous metal sheet 28 and electroplated metal 22 after dissolution of cast mold 30.

A rigid metal mesh, foam, or other porous metal may replace the perforated metal screen in the above-described embodiment. The use of a pliable high porosity mesh or foam is optional and is meant to help insure the rigid mesh or screen does not move away from the tooled cavity face during resin casting. Other methods, such as a pattern of studs either on the metal substrate or the opposing mold face to prevent such movement of the porous metal substrate can also be used. Macroporous metal sheets such as those depicted as drawing number 28 in FIGS. 2A–2E may be used as backings to help position the microporous substrate and also add rigidity to the assembly.

The tooled features in the molding cavity might be provided by the LIGA fabrication of a metal tool, similar to those used in the above RIM or RTM process, which is inserted into a mold base designed to accommodate interchangeable tooling inserts. This type of molding process, which uses free porous metal substrates in the mold cavity, is facilitated by a vertical arrangement of the molding machine.

A variety of porous metal materials suitable for use as the porous metal substrate. Suitable metals include, but are not limited to, Cu, Ni, Ti, Al, Ag, Au, Pt, stainless steel, and combinations thereof. Many porous metal substrates are commercially available. For example, Mott Industrial (division of Mott Corporation in Farmington, Conn.) manufactures a range of hard sintered meshes widely used in filtering and sparging applications. These are available in a range of metals (stainless steel, Monel, nickel, Hastelloy, Inconel, titanium, silver, gold and platinum) are sintered into a variety of shapes with average porosities of 0.2, 0.5, 1, 2, 5, 10, 20, 40 and 100 microns. Technetics Corporation in DeLand, Fla. manufactures porous metal felts from various alloys using 10–150 micron fibers and 35–90% pore volumes. Buckbee-Mears St. Paul (division of BMC Industries, Inc. in Minneapolis, Minn.) manufactures micro-etched metal screens with a wide range of hole sizes (down to 3 mils in diameter) and in various spatial arrangements. Specialty metals other than the standard stainless steel can be requested. Inco Limited in Toronto, Canada manufactures compressible woven foams from nickel.

Macroporous metal screens suitable for use as the rigid metal backing are available from sheet metal producers with pore sizes, ranging from $\frac{1}{16}$ to $\frac{1}{2}$ inch, in both straight rows and staggered hole patterns. Materials are typically stainless, tool or carbon steel and sheet thicknesses are typically 16 to 24 gauge (about 0.06 to 0.02 inches).

The porous metal substrate can be modified by the application of a thin metal coating or strike suitable for later dissolution. Such a coating or strike is conventionally applied by electroplating techniques or by other metal coating techniques known in the art. The metal coating or strike may be of the same metal as that used in the porous metal substrate or may be selected from a different metallic material. While many metals are suitable for use as a coating or strike, copper is most commonly used, particularly in conjunction with the fabrication of nickel-plated parts due to the selective etching behavior of copper.

The castable liquid composition may comprise a variety of curable monomers that may be hardened or polymerized after infusion into the master mold. Such castable materials are well known in the art and include thermally curable polymers and photolytically curable polymers as well as polymers that cure by a chemical reaction between a resin such as an epoxy or isocyanate and a curing/hardening agent such as an amine or polyol. Reactions of polyisocyanates and various curing agents to form polyurethanes are widely used in RIM processing. These categories often overlap as acrylic formulations can be cured by either heat or light depending on the chemical curing agents added.

Many curable monomers include double bonds that can be reacted in an addition polymerization reaction. These polymerization reactions are typically free radical in nature although ionic polymerization can also be used. Examples of such curable monomers include, but are not limited to, vinyl monomers such as acrylic and methacrylic acid and their esters such as methyl, ethyl, propyl, butyl, and hexyl esters, or other acrylates or methacrylates. Polyfunctional monomers such as diacrylates and dimethacrylates or higher functionality monomers can be added to modify the properties and cure behavior of standard monomeric acrylic and methacrylic casting formulations. Other curable monomers that react through addition polymerization of a double or triple bond include styrene and related monomers such as divinylbenzene, modified styrene monomers such as p-methyl styrene or hydroxy styrene, diallyl phthalates, maleimides, acetylene-terminated monomers and others. Also useful are castable siloxane monomers such such as dimethyl siloxane, diphenyl siloxane, methylvinyl siloxane, and methylphenyl siloxane, and silicone rubbers such as polydimethyl siloxane (PDMS) and others that are available with a variety of curing chemistries.

The castable liquid formulation may also include various additives and fillers. Additives include, for example, curing agents, cure accelerators, cure inhibitors, internal mold release agents and dyes. Fillers include, but are not limited to, inorganic fillers (such as mineral fillers, i.e., calcium carbonate, clays, metal oxides, and the like), metal fillers, polymeric fillers (such as TEFLON™ powder and rubber fillers), pigments and dyes, silicas and others. It is also common in cast acrylic and methacrylic resin formulations to include pre-polymerized acrylic and methacrylic polymers in the castable liquid formulation. The inclusion of these polymers reduces the cure shrinkage and exothermal output and improves the quality of the casting.

Specific additives used have included Axel AM-121 mold release from Axel Plastics Research Laboratories, Inc. in Woodside, N.Y. and PIM red dye from Vantico (formerly Ciba-Geigy) in East Lansing, Mich.

For compositions containing thermally curable polymers, heat is applied during and/or after the infusion of the liquid through the porous metal substrate and into the cavities of the master mold. The heating temperature and time will depend on the polymer used, but generally temperatures higher than about 50° C., more typically higher than about 70° C., are employed, with heating times of 30 minutes or more. It is also common in hand-casting processes to allow the curing reaction to proceed at room temperature for several hours or even a day before completing the cure in an oven. The oven cure may be at a single temperature or a time-temperature program may be used. In automated RTM or RIM processes, the mold is typically heated and the curing reaction proceeds rapidly so as to allow demolding in a short period. Additional post-curing may also be used with such processes. For photolytically curable polymers, the castable liquid formulation is irradiated with light of a suitable wavelength (e.g., ultraviolet light) rather than heated. In some cases, i.e., with some curable polymers, irradiation with an electron beam is particularly effective in bringing about curing.

A feature important to the sacrificial plastic molds of this invention is their ability to be dissolved in appropriate solvents such as aliphatic hydrocarbons, ketones, halogenated hydrocarbons, aromatic hydrocarbons, alcohols, ethers, hydrofluoroethers and hydrofluorocarbons, glycols, glycol ethers and glycol esters, carbonates, polar aprotic solvents such as dimethylsulfoxide and dimethylformamide, and others. These will vary in usefulness according to the nature of the cured formulation. Commonly used solvents to dissolve plastics would include acetone, dichloromethane, dimethylformamide and tetrahydrofuran. Some plastics are also susceptible to aqueous acids or bases. Commercially available solvent mixtures are also available to dissolve specific materials such as Dynasolve™, (Dynaloy, Inc., Indianapolis, Ind.) to remove silicone rubbers.

Appropriate radiation, oxidative, thermal or other treatments might be used to degrade the molecular structure of the cast mold to enhance the solubility of the sacrificial mold or to directly remove the plastic. This might include UV or x-ray exposure or an ashing treatment.

The use of replicated sacrificial molds for the production of electroplated metal structures and parts provides significant savings in both time and money in the production of larger volumes of micro-scale devices. In contrast to the standard LIGA process, only one synchrotron exposure is needed to fabricate a molding or embossing tool that can then be used to form repetitive copies of the sacrificial plastic mold used in the electroplating step.

Some of the many uses of the invention include the manufacture of micro-scale chem/bio detectors, portable or miniaturized medical diagnostic equipment, DNA analysis equipment, optical switches and related equipment, inertial sensing devices, and other miniaturized devices.

It is to be understood that while the invention has been described in conjunction with the preferred specific embodiments thereof, the foregoing description and the examples that follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

EXAMPLES

A nickel-plated tool steel stamp with feature heights of 300 micron was used in the examples below. Both x-ray lithography with PMMA resists and UV lithography with SU-8 resists have been used to create the stamp microfeatures. Feature types included gears, wedges, posts, straight and circular channels, and other designs. The features were located within a circular area with a diameter of 2.375 inches in the center of a 3-inch diameter stamp. The tool steel base was electrolytically coated with a thin copper strike prior to the lithographic process to facilitate plating of the nickel features.

Prior to casting, the stamp was placed on a supportive solid aluminum disk 4.25 inch diameter. A cast silicone rubber collar was placed around the stamp to fill in the area between the edge of the stamp and the edge of the aluminum disk and prevent the stamp from being fully completely immersed in the casting solution. The aluminum disk was then encircled with stiff tape projecting above the level of the disk to form a casting cavity. The mold insert was sprayed with Teflon mold release and allowed to dry.

Example 1

A solution of PS-30 castable acrylic cement (made by Caseway Industrial Products and sold by Konrady Plastics, Inc., Portage, Ind.) was mixed together in the following approximate ratios:

| | |
|---|---|
| Part A solution of poly(methyl methacrylate) in methyl methacrylate | 87.8% |
| Additional methyl methacrylate | 6.5% |
| Axel AM-121 internal mold release (Axel Plastics Research Laboratories, Inc., Woodside, NY) | 1.0% |
| Vantico PIM red dye (Vantico (formerly Ciba-Geigy) East Lansing, MI) | 0.1% |
| Part B solution of catalyst in methyl methacrylate | 4.6% |

The solution was covered to prevent evaporation of the methyl methacrylate monomer and allowed to passively degas for 15 minutes. Just enough of the PS-30 solution was poured in the cavity to wet the features on the stamp. The cavity was covered and left for two minutes to allow air bubbles to escape from the features. A 125-micron thick disk of stainless steel with 150 micron holes in a square array with 250 micron pitch (Buckbee-Mears, Saint Paul, Minn. 538 Micro-Etch™ screen) was placed in the cavity and pressed down through the solution until it made contact with the stamp features. Additional casting solution was added and a pliable, porous nickel foam disk (Inco Limited, Toronto, Ontario, Canada) was then placed on top of the microscreen and pressed down. Four stainless steel disks (1/32 inch thick with a 0.5 inch diameter hole in the center) were placed onto the nickel foam. These plates might be replaced with a single plate about 1/8 inch thick or some other convenient thickness. These disks provide rigidity to the final cured mold. The microscreen, the nickel foam and the stainless steel disks were all cut into approximately 3.5 inch diameter disks. Enough PS-30 solution was then added to cover all the backing materials.

A piece of MYLAR™ (DuPont Nemours and Company Co., Wilmington, Del.) film coated with mold release on both sides was placed on top of the stacked disks followed by a 3-inch diameter solid metal disk about 0.5 inches high. This top disk provides pressure contact with the assembly without deforming the taped edge. The entire assembly was sealed with tape to prevent oxygen inhibition of the cure and placed in a Carver press. 17,000 pounds of pressure were applied, sealing the micro-etched screen against the top of the stamp and squeezing the casting solution from between the microscreen and the top of the nickel features. While maintaining pressure, the assembly was left to cure overnight. The next day, the assembly was removed from the press and placed in a 165° F. oven for 6 hours to finish curing.

Removal of the top disk, Mylar film and tape provided a cast acrylic mold containing an electroplatable base. A brief plasma etch was used to remove trace polymer which had penetrated between the micro-etched screen and the stamp features, partially covering the screen area to be electroplated.

The sacrificial plastic mold was electrolytically cleaned in a 70% v/v sulfuric acid solution at a current density of 150 A/ft² for about three minutes. The fresh stainless steel surfaces within the mold were given a Wood's nickel strike in a nickel chloride bath at 50 A/ft² for about three minutes followed by a copper seed layer deposited from a copper sulfate bath at 15 A/ft² for about ten minutes. The mold was then placed in a nickel sulfamate electroplating bath at 15 A/ft² for about 20 hours. After adhesively bonding the screen and plastic mold to a support disk, the overplated metal was lapped.

After lapping, the PMMA was dissolved in acetone, leaving the metal features attached to the micro-etched screen.

Example 2

Preparation of the casting base was identical to the procedure in Example 1. RTV 630 (made by General Electric) Silicone Rubber part A was thoroughly mixed with GE RTV 630 Silicone Rubber part B in a 10 to 1 ratio and degassed to 120 millitorr. Enough PDMS to cover the features was poured into the cavity and degassed to 120 millitorr. The microscreen, nickel foam and four metal disks were placed on top of the stamp, more PDMS was added to encase the backing materials and the assembly was again degassed to 120 millitorr. A piece of Mylar film coated with mold release on both sides was placed on top of the stacked disks followed by a 3-inch diameter solid metal disk about 0.5 inches high. The assembly was pressed as in Example 1. The PDMS was allowed to cure at room temperature for 24 additional hours after removal from the press.

Removal of the top disk, Mylar film and tape provided a cast silicone rubber mold containing an electroplatable base. A brief plasma etch was used to remove trace polymer which had penetrated between the micro-etched screen and the stamp features, partially covering the screen area to be electroplated.

The sacrificial plastic mold was electrolytically cleaned in a 70% v/v sulfuric acid solution at a current density of 150 A/ft² for about three minutes. The fresh stainless steel surfaces within the mold were given a Wood's nickel strike in a nickel chloride bath at 50 A/ft² for about three minutes followed by a copper seed layer deposited from a copper sulfate bath at 15 A/ft² for about ten minutes. The mold was then placed in a nickel sulfamate electroplating bath at 15 A/ft² for about 20 hours. After adhesively bonding the screen and plastic mold to a support disk and planarizing the plated surface with PS-30, the overplated metal was lapped.

After lapping, the PDMS mold was peeled away in pieces leaving the metal features attached to the micro-etched screen.

We claim:

1. A sacrificial plastic mold, comprising:
   a polymeric substrate comprised of a cured castable liquid formulation;
   a porous metal substrate embedded within the polymeric substrate having an upper surface that is substantially co-planar with the upper surface of the polymeric substrate; and
   microscale features comprised of the cured castable liquid formulation projecting from said upper surfaces of the porous metal and polymeric substrates.

2. The sacrificial plastic mold of claim 1, wherein two or more levels of microscale features project from the upper surface of the porous metal substrate and the polymeric substrate.

3. The sacrificial plastic mold of claim 1, wherein the castable liquid formulation contains one or more monomers that are capable of being thermally, photolytically, or chemically cured to form a polymeric product.

4. The sacrificial plastic mold of claim 3, wherein the castable liquid formulation further comprises at least one of an optional curing agent, a cure accelerator, a cure inhibitor, and an internal mold release agent.

5. The sacrificial plastic mold of claim 3, wherein the castable liquid formulation further includes a filler selected from the group consisting of inorganic fillers, polymeric fillers, metal powders, pigments, dyes, and mixtures thereof.

6. The sacrificial plastic mold of claim 3, wherein the one or more monomers are selected from the group consisting of acrylic acids, acrylic acid esters, methacrylic acids, methacrylic acid esters, and combinations thereof.

7. The sacrificial plastic mold of claim 3, wherein the one or more monomers are selected from the group consisting of diallyl phthalates, maleimides, acetylene-terminated monomers, styrene, divinylbenzene and modified styrene monomers.

8. The sacrificial plastic mold of claim 3, wherein the one or more monomers are siloxane monomers.

9. The sacrificial plastic mold of claim 3, wherein the siloxane monomers are selected from the group consisting of dimethyl siloxane, diphenyl siloxane, methylvinyl siloxane, and methylphenyl siloxane monomers.

10. The sacrificial plastic mold of claim 3, wherein the one or more monomers comprising the castable liquid formulation are selected from the group consisting of epoxides, epoxy resin hardeners, and polyurethane precursors.

11. The sacrificial plastic mold of claim 6 wherein the castable liquid formulation further comprises pre-polymerized acrylate or methacrylate polymer.

12. The sacrificial plastic mold of claim 1, wherein said cured castable liquid formulation comprises polymethylmethacrylate (PMMA).

13. The sacrificial plastic mold of claim 1, wherein more than one porous metal substrate is embedded in said polymeric substrate.

14. The sacrificial plastic mold of claim 1, wherein the porous metal substrate is selected from the group consisting of a metal mesh, a sintered metal mesh, a perforated metal screen, an etched metal screen, a metal foam, a metal felt, a metal mat, a rigid metal plate, and a perforated rigid metal plate.

15. The sacrificial plastic mold of claim 1, wherein said porous metal substrate is comprised of a metallic material selected from the group consisting of Cu, Ni, Ti, Al, Ag, Au, Pt, stainless steel, and combinations thereof.

16. The sacrificial plastic mold of claim 1, wherein said porous metal substrate comprises a porous metal structure covered by a metallic coating.

17. The sacrificial plastic mold of claim 15, wherein the porous metal and the metal coating are comprised of different metals.

18. The sacrificial plastic mold of claim 15, wherein the metallic coating is comprised of copper metal.

* * * * *